United States Patent
Orth

(10) Patent No.: US 10,088,382 B2
(45) Date of Patent: Oct. 2, 2018

(54) METHOD FOR EXAMINING THE LEAKTIGHTNESS OF A CLOSED HOUSING OF AN ELECTRICAL COMPONENT

(71) Applicant: Dr. Ing. h.c. F. Porsche Aktiengesellschaft, Stuttgart (DE)

(72) Inventor: Christoph Orth, Marbach (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 94 days.

(21) Appl. No.: 15/068,876

(22) Filed: Mar. 14, 2016

(65) Prior Publication Data

US 2016/0282218 A1    Sep. 29, 2016

(30) Foreign Application Priority Data

Mar. 23, 2015  (DE) ......................... 10 2015 104 274

(51) Int. Cl.
*G01M 3/22* (2006.01)

(52) U.S. Cl.
CPC .................................. *G01M 3/226* (2013.01)

(58) Field of Classification Search
CPC .......... G01M 3/02; G01M 3/10; G01M 3/202; G01M 3/20; G01M 3/226; G01M 3/3236; G01M 3/3281
See application file for complete search history.

(56) References Cited

U.S. PATENT DOCUMENTS

| | | | |
|---|---|---|---|
| 3,888,111 A | 6/1975 | Craig | |
| 5,085,951 A * | 2/1992 | Gyenes | H01M 2/1022 429/53 |
| 6,593,026 B1 | 7/2003 | Tukawaki et al. | |
| 9,385,400 B2 * | 7/2016 | Tsukui | H01M 10/04 |
| 2004/0159144 A1 * | 8/2004 | Abelen | G01M 3/227 73/49.3 |
| 2006/0016249 A1 * | 1/2006 | Ache | G01M 3/228 73/40.7 |
| 2011/0020676 A1 * | 1/2011 | Kurosawa | B60K 1/04 429/62 |
| 2014/0127539 A1 * | 5/2014 | Helber | B60K 1/04 429/56 |
| 2015/0155603 A1 * | 6/2015 | Tsukui | H01M 10/4228 73/40.7 |
| 2015/0207182 A1 * | 7/2015 | Tsukui | H01M 10/0431 429/185 |

FOREIGN PATENT DOCUMENTS

| | | | | |
|---|---|---|---|---|
| DE | 102007063193 | * | 1/2009 | ......... H01M 2/1061 |
| DE | 10 2009 035 484 | | 2/2011 | |
| DE | 102010044715 | * | 5/2011 | ......... H01M 2/1229 |
| JP | 5-21089 | | 1/1993 | |
| JP | 2002117901 A | | 4/2002 | |
| JP | 2004-039387 | | 2/2004 | |

OTHER PUBLICATIONS

German Search Report dated Jan. 12, 2016.

* cited by examiner

*Primary Examiner* — David A Rogers
(74) *Attorney, Agent, or Firm* — Gerald E. Hespos; Michael J. Porco; Matthew T. Hespos

(57) ABSTRACT

A method is provided for examining the leaktightness of a closed housing of an electrical component. This method includes flooding the housing with a gas mixture that contains a high proportion of an inert gas and a low residual proportion of a gas that can be detected by a measuring probe. During the flooding process, gas that is located inside the housing is forced out of the housing. The method proceeds by determining any leak in the housing by detecting gas escaping from the housing, installing the electrical component when the housing is proven to be leaktight, with the inert gas remaining in the housing.

12 Claims, No Drawings

METHOD FOR EXAMINING THE LEAKTIGHTNESS OF A CLOSED HOUSING OF AN ELECTRICAL COMPONENT

CROSS REFERENCE TO RELATED APPLICATION

This application claims priority under 35 USC 119 to German Patent Appl. No. 10 2015 104 274.6 filed on Mar. 23, 2015, the entire disclosure of which is incorporated herein by reference.

BACKGROUND

1. Field of the Invention

The invention relates to a method for examining the leaktightness of a closed housing of an electrical component for subsequent fire-resistant use of the electrical component.

2. Description of the Related Art

The housings of electrical components that are used in motor vehicles are to be examined for leaktightness with respect to penetration by water and the ingress and/or escape of harmful gases. The electrical components are, for example, high-voltage energy stores or controllers.

Components of this kind and housings of components of this kind are usually subject to a negative pressure during the examination for leaktightness, for example using the differential pressure method.

U.S. Pat. No. 6,593,026 B1 describes a sealed battery and a method for producing the sealed battery. The battery is filled with an electrolytic liquid and an inert gas, such as helium. The inert gas can be mixed with other inert gases or with gases such as nitrogen, carbon dioxide etc. It is considered to be particularly advantageous that proportion of inert gas is high since the inert gas, in particular helium, has relatively small molecules the can easily enter through small leakage points.

DE 10 2009 035 484 A1 describes a flat electrochemical cell for a battery. The flat cell is formed from a stack of electrodes and electrodes of identical polarity are electrically conductively connected to one another to form a pole. The stack of electrodes is surrounded on all sides and in a gastight manner by a film. The film is formed from a plastic, in particular from Teflon. A residual volume is formed between the stack of electrodes and the film and is filled with an inert gas, namely argon.

The object of the invention is to provide a simple method for examining the leaktightness of a housing of an electrical component for subsequent fire-resistant use of the electrical component.

SUMMARY

To examine the leaktightness of the closed housing of the electrical component, the housing is first flooded with a gas mixture. This gas mixture contains a high proportion of an inert gas and a low residual proportion of a gas that can be detected by a measuring probe. When the housing is flooded with the gas mixture, gas that is located inside the housing is forced out of said housing. After the housing is flooded with the gas mixture, any leak in the housing is determined by detecting gas escaping from the housing. In this case, that gas of the gas mixture that can be detected by the measuring probe is determined. If it is established that the housing is leaktight, the electrical component is installed with the inert gas remaining in the housing. Since the inert gas contains a high proportion of the gas mixture, a high degree of fire resistance of the electrical component is ensured.

The electrical component is installed when the housing is proven to be leaktight, with the gas mixture comprising inert gas and gas that can be detected by the measuring probe remaining in the housing. Therefore, the gas mixture comprising those gases of the gas mixture with which the housing is flooded permanently remains in the electrical component. This is possible when the volume inside the housing can increase and further reduce under the action of heat, that is to say heating and cooling. This is possible particularly when there is a dynamic compensation volume in the housing. As an alternative, housings in which gas exchange with the surrounding area is possible with a diaphragm or the like. In this case, the gas that can be detected by the measuring probe can exit the housing through the diaphragm when there is an increase in volume of the gas mixture inside the housing. In the event of a volume reduction or subsequent volume reduction, gas, that is to say air or oxygen, can enter the housing via the diaphragm from the outside, so that a slight change in the composition of the gases that are located inside the housing takes place. However, a high proportion of inert gas still remains in the housing.

In the first alternative described above, the gas mixture comprising inert gas and gas that can be detected by the measuring probe permanently remains in the installed electrical component. In the second alternative, when the electrical component is installed, the gas that can be detected by the measuring probe in the housing is replaced by air or oxygen entering the housing from the outside by means of a diaphragm in the housing.

The inert gas may be nitrogen. The gas that can be detected by the measuring probe may be hydrogen or helium.

The gas mixture preferably contains at least 90% of inert gas, in particular at least 95% of inert gas, and at most 10% of gas that can be detected by the measuring probe, in particular at most 5% of gas that can be detected by the measuring probe. In particular, it is provided that the gas mixture contains 95% of inert gas and 5% of gas that can be detected by the measuring probe. The abovementioned percentage values are volume values.

The method for examining the leaktightness of the closed housing of the electrical component may relate to an electrical component in the form of a high-voltage energy store or a controller. The high-voltage energy store is preferably a high-voltage battery. In particular, the high-voltage energy store is a traction battery. The high-voltage energy store, in particular the traction battery, preferably has lithium-ion cells. Damage may lead to fires specifically when lithium-ion cells are used.

The electrical component is, in particular, a constituent part of a motor vehicle.

What is claimed is:

1. A method for examining leaktightness of a closed housing of an electrical component for a vehicle and for ensuring fire resistance, comprising:
    flooding the housing with a gas mixture that contains at least 90% of an inert gas and no more than 10% of a detectable gas that can be detected by a measuring probe, wherein, the flooding causes gas that is located inside the housing to be forced out of the housing,
    determining whether any leak exists in the housing by using the measuring probe for detecting any of the detectable gas escaping from the housing, installing the housing and the electrical component in the vehicle when the housing is proven to be leaktight, with the gas mixture that contains at least 90% of the inert gas remaining in the housing for ensuring the fire resistance allowing a composition of the gas in the housing that has been installed in the vehicle to be changed in response to conditions that promote a gas volume increase by permitting at least part of the detectable gas in the housing to exit the housing via a diaphragm in the housing while having the inert gas remain in the housing, and allowing the composition of the gas in the housing that has been installed in the vehicle to be changed in response to conditions that promote a gas volume decrease by permitting air or oxygen to enter the housing via the diaphragm.

2. The method of claim 1, wherein the inert gas is nitrogen.

3. The method of claim 1, wherein the detectable gas is hydrogen.

4. The method of claim 1, wherein the gas mixture contains 95% of inert gas and 5% of the detectable gas that can be detected by the measuring probe.

5. The method of claim 1, wherein the electrical component is a traction battery with lithium-ion cells.

6. The method of claim 1, wherein the electrical component is a controller.

7. The method of claim 1, wherein the inert gas is nitrogen.

8. The method of claim 1, wherein the detectable gas that can be detected by the measuring probe is hydrogen.

9. The method of claim 1, wherein the detectable gas that can be detected by the measuring probe is helium.

10. The method of claim 1, wherein the gas mixture contains 95% of inert gas and 5% of the detectable gas that can be detected by the measuring probe.

11. The method of claim 1, wherein the electrical component is a traction battery with lithium-ion cells.

12. The method of claim 1, wherein the electrical component is a controller.

* * * * *